(12) United States Patent
Poliakov

(10) Patent No.: US 11,216,949 B1
(45) Date of Patent: *Jan. 4, 2022

(54) GAZE-BASED CONTROL OF DEVICE OPERATIONS

(71) Applicant: Snap Inc., Santa Monica, CA (US)

(72) Inventor: Fedir Poliakov, Odessa (UA)

(73) Assignee: Snap Inc., Santa Monca, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 16/708,584

(22) Filed: Dec. 10, 2019

Related U.S. Application Data

(63) Continuation of application No. 16/418,333, filed on May 21, 2019, now Pat. No. 10,535,139, which is a continuation of application No. 15/829,539, filed on Dec. 1, 2017, now Pat. No. 10,346,985, which is a continuation of application No. 15/821,405, filed on Nov. 22, 2017, now Pat. No. 10,102,634, which is a continuation of application No. 14/884,536, filed on Oct. 15, 2015, now Pat. No. 9,830,708.

(51) Int. Cl.
*G06K 9/00* (2006.01)
*G06T 7/11* (2017.01)
*G06T 7/90* (2017.01)

(52) U.S. Cl.
CPC .............. *G06T 7/11* (2017.01); *G06K 9/0061* (2013.01); *G06K 9/00604* (2013.01); *G06K 9/00617* (2013.01); *G06T 7/90* (2017.01); *G06T 2207/10024* (2013.01)

(58) Field of Classification Search
CPC .............. G06F 3/013; G09G 2354/00; G09G 2320/068; G06K 9/00228; G06K 9/00288; G06K 9/00604
See application file for complete search history.

(56) References Cited

U.S. PATENT DOCUMENTS

| | | | |
|---|---|---|---|
| 4,973,149 A | 11/1990 | Hutchinson | |
| 6,038,295 A | 3/2000 | Mattes | |
| 6,204,858 B1 * | 3/2001 | Gupta | H04N 1/62 345/600 |
| 6,614,919 B1 | 9/2003 | Suzaki et al. | |
| 6,980,909 B2 | 12/2005 | Root et al. | |
| 7,173,651 B1 | 2/2007 | Knowles | |
| 7,411,493 B2 | 8/2008 | Smith | |
| 7,535,890 B2 | 5/2009 | Rojas | |

(Continued)

FOREIGN PATENT DOCUMENTS

CA 2887596 A1 7/2015

OTHER PUBLICATIONS

Leyden, J., "This SMS Will Self Destruct in 40 Seconds", http://www.theregister.co.uk/2005/12/12/stelthtext, Dec. 12, 2005—1 page.

*Primary Examiner* — Li Liu
(74) *Attorney, Agent, or Firm* — Culhane Meadows PLLC; Stephen J. Weed

(57) ABSTRACT

Systems, devices, media, and methods are presented for gaze-based control of device operations. One method includes receiving a video stream from an imaging device, the video stream depicting one or more eyes, determining a gaze direction for the one or more eyes depicted in the video stream, detecting a change in the gaze direction of the one or more eyes, and triggering an operation in a client device based on the change in the gaze direction.

20 Claims, 11 Drawing Sheets

(56) References Cited

U.S. PATENT DOCUMENTS

| | | | |
|---|---|---|---|
| 8,131,597 B2 | 3/2012 | Hudetz et al. | |
| 8,199,747 B2 | 6/2012 | Rojas | |
| 8,332,475 B2 | 12/2012 | Rosen et al. | |
| 8,718,333 B2 | 5/2014 | Wolf et al. | |
| 8,724,622 B2 | 5/2014 | Rojas | |
| 8,874,677 B2 | 10/2014 | Rosen et al. | |
| 8,909,679 B2 | 12/2014 | Root et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root et al. | |
| 9,335,819 B1 | 5/2016 | Jaeger et al. | |
| 9,443,227 B2 | 9/2016 | Evans et al. | |
| 9,489,661 B2 | 11/2016 | Evans et al. | |
| 9,491,134 B2 | 11/2016 | Rosen et al. | |
| 9,606,622 B1 | 3/2017 | Brothers et al. | |
| 10,535,139 B1 | 1/2020 | Poliakov | |
| 2005/0213792 A1* | 9/2005 | Hammoud | G06T 7/248 382/103 |
| 2006/0147094 A1 | 7/2006 | Yoo | |
| 2006/0204041 A1* | 9/2006 | Hammoud | G06K 9/00597 382/107 |
| 2007/0160267 A1 | 7/2007 | Jones et al. | |
| 2007/0291983 A1 | 12/2007 | Hammoud | |
| 2008/0069410 A1 | 3/2008 | Ko et al. | |
| 2008/0219515 A1 | 9/2008 | Namgoong | |
| 2009/0086165 A1 | 4/2009 | Beymer | |
| 2009/0252382 A1 | 10/2009 | Liu et al. | |
| 2011/0019150 A1 | 1/2011 | Schuhrke et al. | |
| 2011/0150334 A1 | 6/2011 | Du et al. | |
| 2011/0202598 A1 | 8/2011 | Evans et al. | |
| 2011/0280454 A1 | 11/2011 | Su et al. | |
| 2012/0036433 A1 | 2/2012 | Zimmer et al. | |
| 2012/0169596 A1 | 7/2012 | Zhuang | |
| 2012/0209924 A1 | 8/2012 | Evans et al. | |
| 2013/0176250 A1 | 7/2013 | Lee et al. | |
| 2013/0342672 A1 | 12/2013 | Gray et al. | |
| 2014/0099005 A1 | 4/2014 | Mogi | |
| 2014/0112335 A1 | 4/2014 | Babenko et al. | |
| 2015/0082181 A1 | 3/2015 | Ames et al. | |
| 2015/0091793 A1 | 4/2015 | Lee et al. | |
| 2015/0097490 A1 | 4/2015 | Okuya et al. | |
| 2015/0116212 A1 | 4/2015 | Freed et al. | |
| 2015/0169053 A1 | 6/2015 | Bozarth et al. | |
| 2015/0199559 A1 | 7/2015 | Sztuk et al. | |
| 2015/0234457 A1 | 8/2015 | Kempinski | |
| 2015/0310651 A1 | 10/2015 | Chandrasekaran | |
| 2016/0009411 A1 | 1/2016 | Davalos et al. | |
| 2016/0063304 A1 | 3/2016 | Yamashita et al. | |
| 2016/0124505 A1 | 5/2016 | Liu | |
| 2016/0224111 A1 | 8/2016 | Kim | |
| 2016/0274762 A1 | 9/2016 | Lopez et al. | |
| 2017/0090561 A1 | 3/2017 | Dow et al. | |
| 2017/0228586 A1 | 8/2017 | Morishita | |

* cited by examiner

GAZE-BASED CONTROL OF DEVICE OPERATIONS

CROSS-REFERENCE TO RELATED APPLICATIONS

This application is a continuation of U.S. patent application Ser. No. 16/481,333 filed May 21, 2019, which is a continuation of U.S. patent application Ser. No. 15/829,539 filed Dec. 1, 2017, now issued as U.S. Pat. No. 10,346,985, which is a continuation of U.S. patent application Ser. No. 15/821,405 filed Nov. 22, 2017, now issued as U.S. Pat. No. 10,102,634, which is a continuation of U.S. patent application Ser. No. 14/884,536, filed on Oct. 15, 2015, now issued as U.S. Pat. No. 9,830,708, all of which are incorporated herein by reference in their entirety.

TECHNICAL FIELD

Embodiments of the present disclosure relate generally to automated image segmentation of a video stream. More particularly, but not by way of limitation, the present disclosure addresses systems and methods for image segmentation of identified areas of interest within a face depicted in a video stream.

BACKGROUND

Telecommunications applications and devices can provide communication between multiple users using a variety of media, such as text, images, sound recordings, and/or video recording. For example, video conferencing allows two or more individuals to communicate with each other using a combination of software applications, telecommunications devices, and a telecommunications network. Telecommunications devices may also record video streams to transmit as messages across a telecommunications network.

Although telecommunications applications and devices exist to provide two way video communication between two devices, there can be issues with video streaming, such as modifying images within the video stream during pendency of a communication session. Also telecommunications devices use physical manipulation of the device in order to perform operations. For example, devices are typically operated by changing an orientation of the device or manipulating an input device, such as a touch screen. Accordingly, there is still a need in the art to improve video communications between devices and accessibility of operations on communications devices.

BRIEF DESCRIPTION OF THE DRAWINGS

Various ones of the appended drawings merely illustrate example embodiments of the present disclosure and should not be considered as limiting its scope.

Figure 1:
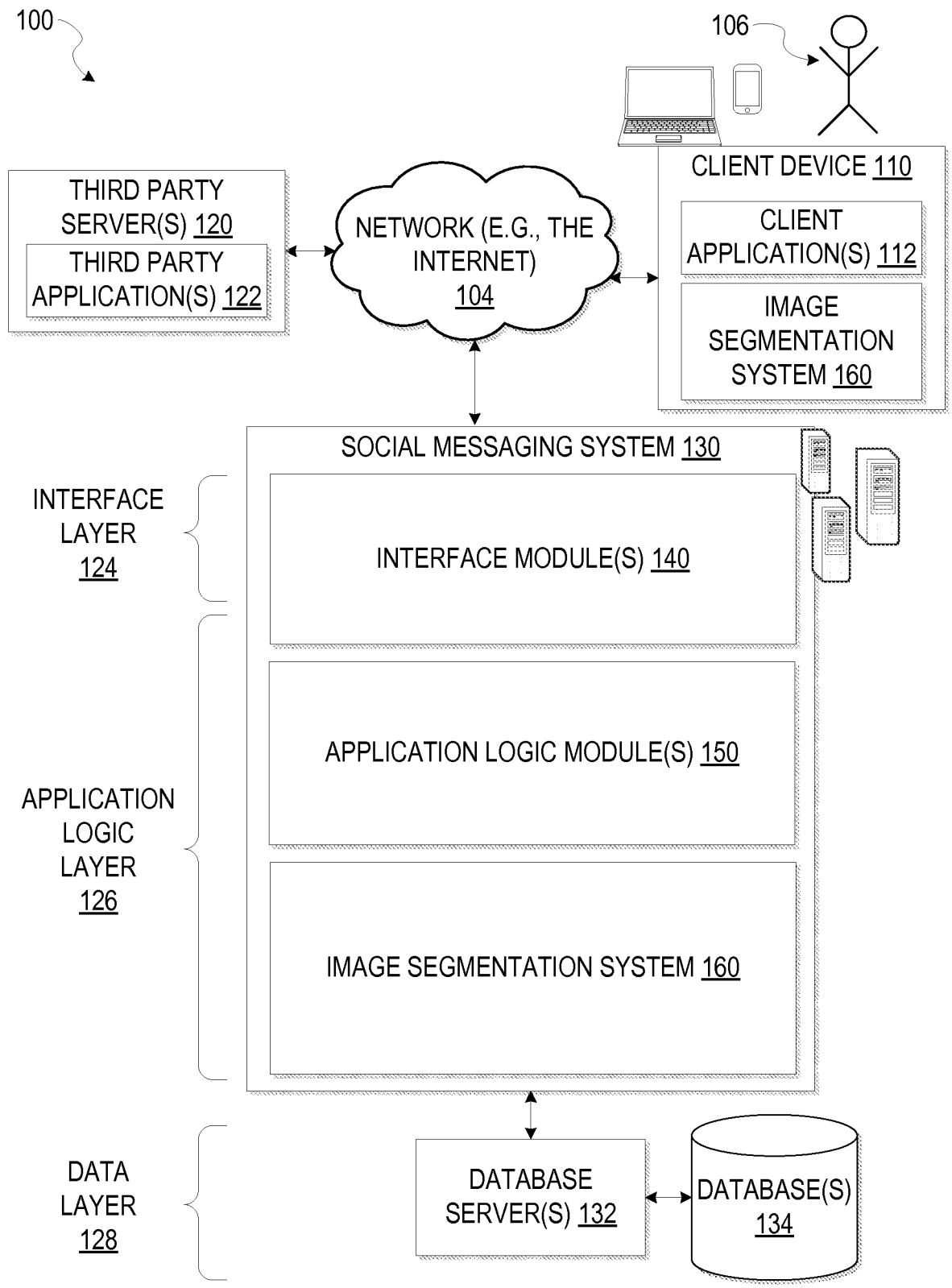
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

An image segmentation system is described that identifies and tracks objects of interest across a video stream through a set of images within the video stream. In various example embodiments, the image segmentation system identifies and tracks one or more facial features depicted in a video stream. The image segmentation system performs iris segmentation, identifying and isolating one or more areas of interest around an eye depicted on the face within the video stream. Using the isolated areas of interest, the image segmentation system identifies an iris of the eyes. The image segmentation system may then track the iris across additional segments of the video stream or a similar video stream. In some instances, the image segmentation system stores data relating to the iris and eye, along with data representative of one or more aspects of a face, where the face includes the iris and eye. Although described with respect to an iris and an eye, it will be understood that the image segmentation system may identify and track multiple irises and eyes on a face. Further, although embodiments of the present disclosure are described with respect to faces and eyes, it should be understood that the image segmentation system may also or alternatively track other objects of interest.

The image segmentation system may use the data relating to the iris and eye to perform biometric identification of an individual. In some instances, the image segmentation system performs color change operations on irises depicted within the video stream. Further, in some example embodiments, the image segmentation system identifies a gaze direction based on a position of the irises. The image segmentation system may use gaze direction to determine a direction, an object, or a portion of an object being viewed by an individual. For example, the image segmentation system may identify the gaze direction of an iris to interpret an intended user interaction with a device. The image segmentation system may identify distinct portions of a user interface device, such as a screen or touchscreen of a computer, a touchscreen of a mobile telephone, or other suitable user interface devices. The image segmentation system then determines, based on the gaze direction, a portion of the user interface device at which the individual's gaze is directed. In some embodiments, the image segmentation system may enable interaction with a client device (e.g., computer, mobile telephone, or a tablet) based on the gaze direction and one or more gestures of the iris or obstructions of the iris.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each module or engine shown in FIG. 1 represents a set of executable software instructions and the corresponding hardware (e.g., memory and processor) for executing the instructions, forming a hardware-implemented module or engine and acting, at the time of the execution of instructions, as a special purpose machine configured to carry out a particular set of functions. To avoid obscuring the inventive subject matter with unnecessary detail, various functional modules and engines that are not germane to conveying an understanding of the inventive subject matter have been omitted from FIG. 1. Of course, additional functional modules and engines may be used with a social messaging system, such as that illustrated in FIG. 1, to facilitate additional functionality that is not specifically described herein. Furthermore, the various functional modules and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface modules (e.g., a web server) 140, which receives requests from various client-computing devices and servers, such as client devices 110 executing client application(s) 112, and third party servers 120 executing third party application(s) 122. In response to received requests, the interface module 140 communicates appropriate responses to requesting devices via a network 104. For example, the interface modules 140 can receive requests such as Hypertext Transfer Protocol (HTTP) requests, or other web-based, Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client devices 110 form all or part of an image segmentation system 160 such that modules of the image segmentation system 160 configure the client device 110 to perform a specific set of functions with respect to operations of the image segmentation system 160.

In an example, the client devices 110 are executing the client application(s) 112. The client application(s) 112 can provide functionality to present information to a user 106 and communicate via the network 104 to exchange information with the social messaging system 130. Further, in some examples, the client devices 110 execute functionality of the image segmentation system 160 to segment images of video streams, transmit video streams (e.g., with image data modified based on the segmented images of the video stream), or control operations (e.g., input and navigation operations) of the client device 110 using data determined from the segmented images of the video stream.

Each of the client devices 110 can comprise a computing device that includes at least a display and communication capabilities with the network 104 to access the social messaging system 130, other client devices, and third party servers 120. The client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client devices 110. In some embodiments, the user 106 interacts with the social messaging system 130 via the client devices 110. The user 106 may not be part of the networked environment, but may be associated with the client devices 110.

As shown in FIG. 1, the data layer 128 has database servers 132 that facilitate access to information storage repositories or databases 134. The databases 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts)

on the social messaging system 130 and interact with a broad range of applications provided by the social messaging system 130.

The application logic layer 126 includes various application logic modules 150, which, in conjunction with the interface modules 140, generate various user interfaces with data retrieved from various data sources or data services in the data layer 128. Individual application logic modules 150 may be used to implement the functionality associated with various applications, services, and features of the social messaging system 130. For instance, a social messaging application can be implemented with of the application logic modules 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic modules 150.

As illustrated in FIG. 1, the social messaging system 130 may include at least a portion of the image segmentation system 160 capable of transmitting control signals or video modification signals to the client device 110. Similarly, the client device 110 includes a portion of the image segmentation system 160, as described above. In other examples, client device 110 may include the entirety of image segmentation system 160. In instances where the client device 110 includes a portion of (or all of) the image segmentation system 160, the client device 110 can work alone or in cooperation with the social messaging system 130 to provide the functionality of the image segmentation system 160 described herein.

In some embodiments, the social messaging system 130 may be an ephemeral message system that enables ephemeral communications where content (e.g. video clips or images) are deleted following a deletion trigger event such as a viewing time or viewing completion. In such embodiments, a device uses the various modules described herein within the context of any of generating, sending, receiving, or displaying aspects of an ephemeral message. For example, a device may track user eye movement during viewing of an ephemeral message, and may implement any tracking, command, or interface method describe herein both as part of a generation of content for an ephemeral message or as part of a user viewing an ephemeral message.

Figure 2:
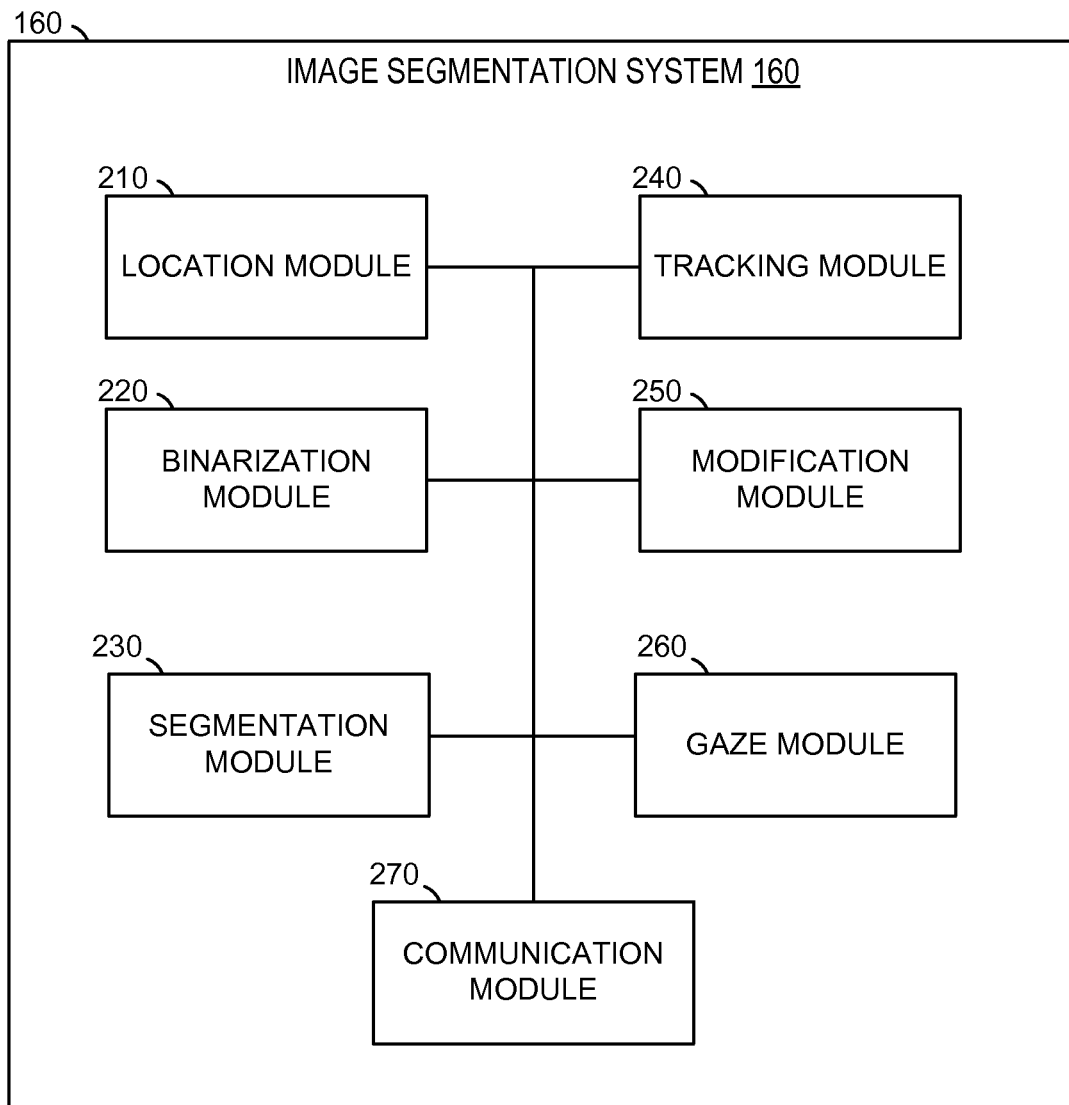
FIG. 2 is a diagram illustrating an image segmentation system, according to some example embodiments.

In FIG. 2, in various embodiments, the image segmentation system 160 can be implemented as a standalone system or implemented in conjunction with the client device 110, and is not necessarily included in the social messaging system 130. The image segmentation system 160 is shown to include a location module 210, a binarization module 220, a segmentation module 230, a tracking module 240, a modification module 250, a gaze module 260, and a communication module 270. All, or some, of the modules 210-270, communicate with each other, for example, via a network coupling, shared memory, and the like. Each module of modules 210-270 can be implemented as a single module, combined into other modules, or further subdivided into multiple modules. Other modules not pertinent to example embodiments can also be included, but are not shown.

The location module 210 performs locating operations within the image segmentation system 160. In various example embodiments, the location module 210 identifies and provides locations for an object of interest depicted by images of a video stream (e.g., one or more frames of a video stream). In some embodiments, the location module 210 may be a portion of a face tracking module or system. In some instances, where an object of interest is a portion of a face, the location module 210 identifies a location of a face depicted in one or more images of within a video stream and one or more facial features depicted on the face. For example, where the location module 210 is configured to locate an iris of an eye, the location module 210 may identify a face depicted within an image, identify an eye on the face, and identify an iris within the eye.

In at least some embodiments, the location module 210 locates an area of interest within the one or more image which contains the object of interest, face, or facial feature. For example, the area of interest identified by the location module 210 may be a portion of the image, such as a rectangle in which the object of interest appears. Although referenced as a rectangle, the area of interest may be any suitable shape or combination of shapes. For example, the area of interest may be represented as a circular shape, a polygonal shape, or an outline shaped and sized similarly to and including the object of interest (e.g., an outline of an eye).

In some embodiments, the location module 210 performs cropping functions. For example, after determining an area of interest within an image, the location module 210 crops the image, removing from consideration areas outside of the area of interest. In some instances, after cropping, the area of interest is processed by one or more other modules of the image segmentation system 160. Where processed by other modules, the location module 210, alone or with cooperation of the communication module 270 transfers the cropped area of interest to one or more other modules (e.g., the binarization module 220).

The binarization module 220 performs binarization functions for one or more of the area of interest identified by the location module 210 and the one or more images of the video stream. The binarization module 220 converts the area of interest or one or more image of the video stream to a binary image, where each pixel has one of two values. In some embodiments, as described below, the binary image produced by the binarization module 220 contains two possible values, zero or one, for any pixel within the binarized image. The binarization module 220 may convert the area of interest or the one or more images of the video to represent the depicted object of interest as a contrasting color image. For example, the pixels in the binarized image may be converted to representing only black (e.g., a value of one) and white (e.g., a value of zero). Once binarized, the binarization module 220 may transmit or otherwise pass the binarized image to one or more additional modules of the image segmentation system 160. For example, the binarization module 220, alone or in cooperation with the communication module 270, may pass the binarized image to the segmentation module 230.

Although described in the present disclosure as a contrasting image composed of black and white pixels, the binarization module 220 may convert the area of interest or the one or more images of the video stream to any two contrasting colors (e.g., red vs. blue). In some embodiments, the binarization module 220 binarizes the area of interest or the one or more images using a red channel of the pixels of the area of interest or the one or more images. In some instances, the binarization module 220 may dynamically adjust the channel or luminance used for binarization based on one or more colors identified by the location module 210 within the area of interest or the one or more images. For example, where binarizing an area of interest of an iris of a blue eye, the binarization module 220 may binarize the area of interest using the red channel of the pixels.

The segmentation module 230 performs segmentation functions within the one or more images of the video stream. In some embodiments, the segmentation module 230 performs segmentation functions on the area of interest within one or more images. In performing the segmentation functions, the segmentation module 230 may identify sub-sections or portions of the object of interest within the area of interest. For example, the segmentation module 230 may identify a pupil and an iris within an eye depicted in the area of interest. After identifying a portion of the object of interest, the segmentation module 230 may determine distances, areas, percentages, and proportions for that object of interest for further processing or functions of the modules of the image segmentation system 160. For example, in the instance of an eye being the object of interest, the segmentation module 230 may identify the pupil and iris within the eye. The segmentation module 230 may then determine an initial pupil location, an initial iris radius, a total width of an eye, and distances from each corner of the eye to a point on the iris nearest to each corner of the eye. The segmentation module 230 may then determine a final pupil location and a final iris radius based on the initial pupil location, the initial iris radius, and one or more additional measurement or determination.

In some instances, after identifying the portion of the object of interest within the area of interest and performing one or more measurements or determinations thereon, the segmentation module 230, alone or in combination with the communication module 270, passes the area of interest and data, representative of the one or more measurement or one or more determination, to one or more additional modules of the image segmentation system 160. For example, the segmentation module 230 may pass the area of interest or data representative of the measurements and determinations of the segmentation module 230 to the tracking module 240, the modification module 250, or the gaze module 260.

The tracking module 240 tracks at least one of the object of interest and the portion of the object of interest based in part on the data (e.g., one or more measurements and one or more determinations) generated by the segmentation module 230. In some embodiments, the tracking module 240 may track a binary mask including of a face or portion of a face identified by the segmentation module 230. For example, where the segmentation module 230 has identified a final pupil location and final iris radius within a first portion of a video stream, the tracking module 240 may cooperate with the location module 210 to track the pupil location and the iris radius across a second portion of the video stream. For example, in some embodiments, the tracking module 240 may form a part of the face tracking module along with the location module 210. The tracking module 240 may operate in cooperation with the modification module 250 and the gaze module 260 to enable the modification module 250 and the gaze module 260 to perform one or more operations on or with respect to the portion of the object of interest or the object of interest, as discussed in more detail below.

The modification module 250 may perform one or more modifications on the object of interest or the portion of the object of interest within the second video stream, based on the tracking of the tracking module 240. For example, the tracking module 240 may identify locations of portions of the object of interest within the second video stream and pass the locations to the modification module 250. In turn, the modification module 250 may perform the one or more modifications to the portions of the object of interest to generate a modified second video stream. The modification module 250 may then pass the modified second video stream to the communication module 270 for transmission to another client device, the social messaging system 130, or a storage device of the client device 110. In some embodiments, the modification module 250 may perform the modifications in real time for transmission of the modified second video stream in a full duplex communication among two or more client devices. For example, where the tracking module 240 tracks the final iris location and the final iris radius identified by the segmentation module 230, the modification module 250 may modify the color of the iris (e.g., from a brown colored iris to a green colored iris) within the second video stream (e.g., a video conference) to generate the modified second video stream. The modification module 250, in cooperation with the communication module 270, may transmit the modified second video stream from the client device 110 to one or more other client device.

The gaze module 260 receives final pupil location and final iris radius data tracked by the tracking module 240 and determines a direction of gaze indicating a direction in which the eye is looking. In some embodiments, the gaze module 260 determines the direction of gaze directed at a portion of a screen of the client device 110. The gaze module 260 may detect changes in gaze, above a predetermined threshold; obstructions of a gaze; or other gaze related actions to control operations of the client device 110. For example, the gaze module 260 may detect a change in gaze direction above a predetermined threshold to navigate a page of text displayed on the client device 110 to scroll down on a displayed page, making additional text viewable. By way of further example, the gaze module 260 may detect an obstruction of the gaze, above a predetermined threshold of time (e.g., a period where eyes are closed). The obstruction may indicate a desire to close an application, perform a screen capture operation, open a message (e.g., a new email or text message), or other operations.

The communication module 270 provides various communications functionality. For example, the communication module 270 receives communication data indicative of data received from an input of the client device 110. The communication data can be indicative of a modified video stream created by a user on the client device 110 for storage or for transmission to a client device of another user. The communication module 270 can cause transmission of the communication data between client devices, via a communications network. The communication module 270 can exchange network communications with the database servers 132, the client devices 110, and the third-party servers 120. The information retrieved by the communication module 270 includes data associated with the user (e.g., member profile data from an online account or social network service data) or other data to facilitate the functionality described herein. In some embodiments, the communication module 270 causes communication between one or more of the location module 210, the binarization module 220, the segmentation module 230, the tracking module 240, and the gaze module 260.

Figure 3:
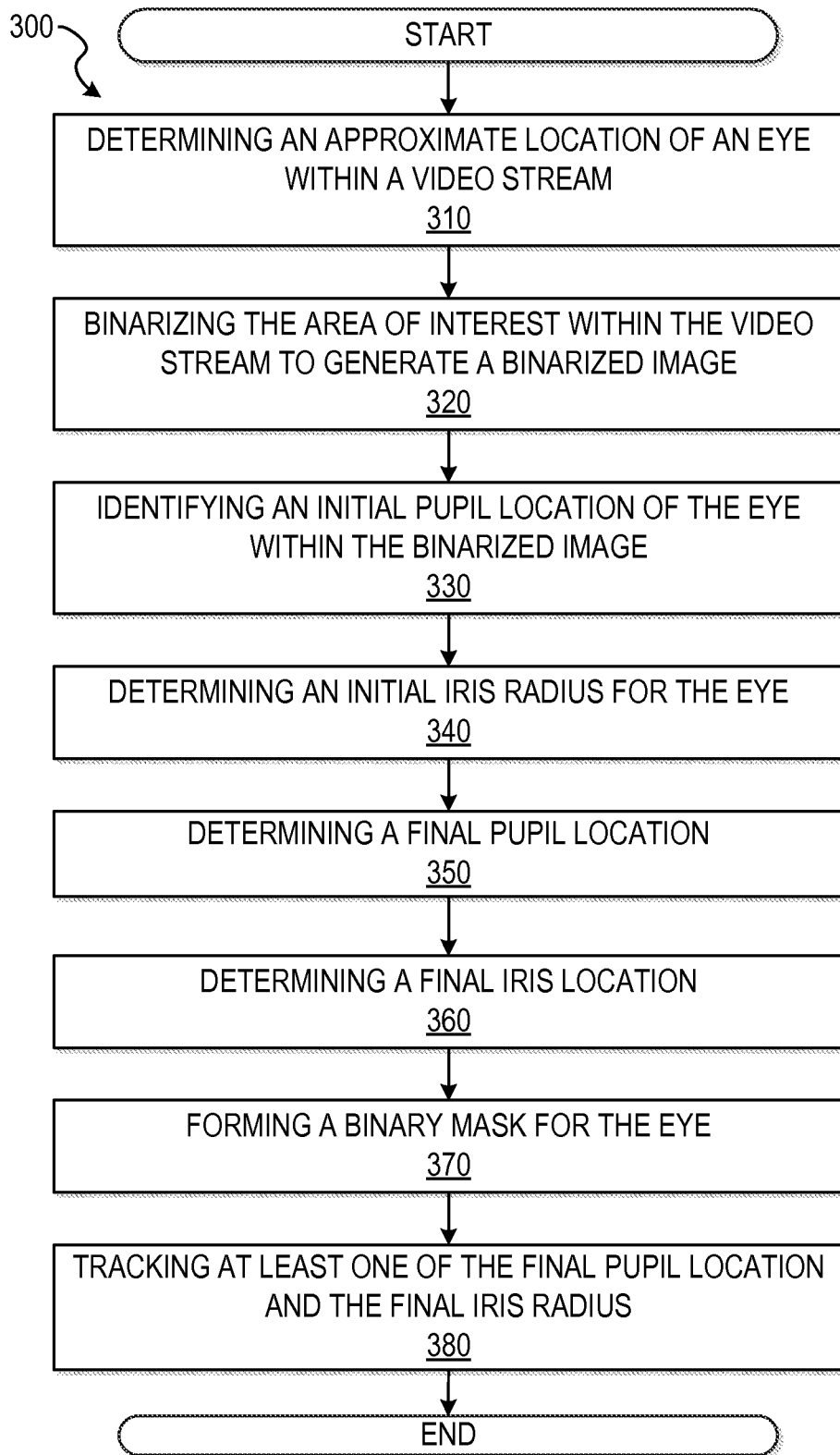
FIG. 3 is a flow diagram illustrating an example method for segmenting images within a video stream, according to some example embodiments.

FIG. 3 depicts a flow diagram illustrating an example method 300 for segmenting portions of a video stream. The operations of method 300 may be performed by components of the image segmentation system 160, and are so described below for purposes of illustration.

Figure 4:
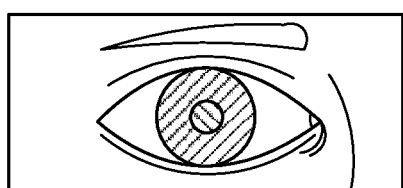
FIG. 4 illustrates an area of interest within one or more images of a video stream, according to some example embodiments.

In operation 310, the location module 210 determines an approximate location of an object of interest within a video stream including a set of images to identify an area of interest within one or more images of the set of images. For example, in some embodiments, the location module 210 determines an approximate location of an eye within the video stream, as shown in FIG. 4. Where the location module 210 determines a location of one or more eyes, the location module 210 may employ a set of face tracking operations to determine one or more landmarks in a face depicted within an image and identify landmarks which represent an eye. In some instances, the area of interest may be a portion of the image extending across a portion of a width of the face, to include both eyes and a portion of the root of the nose and the bridge of the nose positioned between the eyes, and a portion of a height of the face, to include the eyes and eyelids. In some embodiments, the area of interest includes a plurality of areas of interest. For example, where the location module 210 locates an approximate position of two eyes, the plurality of areas of interest may include two areas of interest with each area of interest including a portion of the one or more images sized and shaped to include the an eye and eyelid. In some instances, where the area of interest includes an eye, the area of interest is rectangular in shape and formed such that the area of interest is twenty percent wider than the eye and fifty percent taller than the eye.

In some embodiments, once the location module 210 identifies the area of interest or plurality of areas of interest, the location module 210 crops one or more images within the video stream. For example, the location module 210 discards, or otherwise removes from consideration and processing, portions of the one or more images in the video stream which occur outside of the area of interest. In these embodiments, after cropping, the one or more images of the video stream may be reduced to the area of interest, or plurality of areas of interest, for further processing in the method 300.

Figure 5:
FIG. 5 illustrates a binarized image of an area of interest, according to some example embodiments.

In operation 320, the binarization module 220 binarizes the area of interest within the one or more images to generate a binarized image from the video stream, as shown in FIG. 5. In various example embodiments, the binarization module 220 binarizes the area of interest by determining a threshold value and assigning a first value (e.g., a value of one indicating a black pixel) to pixels which exceed the threshold and a second value (e.g., a value of zero indicating a white pixel) to pixels failing to exceed the threshold. In some embodiments, the area of interest undergoes a filtering process prior to binarization. For example, the binarization module 220 may filter the area of interest to isolate the red channel. The binarization module 220 then binarizes the area of interest using the red channel of the image. In some instances the red channel produces suitable contrast on which to base a determination of the threshold value, such as a contrast between the white sclera of the eye and a blue or grey iris.

In various example embodiments, in operation 320, the segmentation module 230 detects an obstruction of the eye within the area of interest in one or more image within the video stream. The segmentation module 230 identifies one or more obstructed images representing images where the eye is obstructed (e.g., the iris is not identified within the area of interest but another portion of the eye is identified). The segmentation module 230 identifies one or more unobstructed images representing images where the iris of the eye is unobstructed. After the segmentation module 230 identifies unobstructed and obstructed images, the segmentation module passes one or more unobstructed images to the binarization module 220. In response to receiving the one or more unobstructed images, the binarization module 220 binarizes the area of interest within the one or more unobstructed images to generate a binarized image from the video stream. In some embodiments, the binarized image may be a plurality of binarized images. In some instances, only the area of interest of the one or more unobstructed images is passed to the binarization module 220 for binarization.

Figure 7:
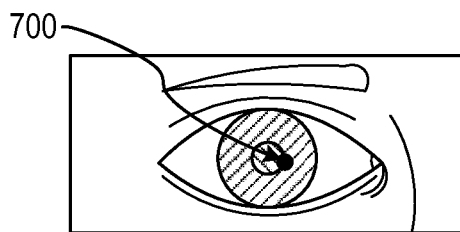
FIG. 7 illustrates a determination of an initial pupil location, according to some example embodiments.

In operation 330, the segmentation module 230 identifies an initial location of a portion of the object of interest within the binarized image. For example, the segmentation module 230 may identify an initial pupil location 700 of a pupil of the eye within the binarized image, as represented in FIG. 7. In some embodiments, the segmentation module 230 identifies a set of first pixels within the binarized image. The set of first pixels has a first value and an area greater than a predetermined percentage of the area of interest. The segmentation module 230 then determines an approximate center of mass of the set of first pixels. In various example embodiments, the set of first pixels is a set of black pixels within the binarized image. For example, as shown in FIG. 5, the set of first pixels 500 is a set of black pixels with an area greater than a predetermined percentage of the area of interest. In some instances, the set of first pixels 500 may contain pixels which are not black, such as a set of second pixels 510. Embodiments including operations for addressing the set of second pixels 510 are discussed with respect to FIG. 11.

In some embodiments, the segmentation module 230 identifies the set of first pixels by determining perimeter regions within the binarized image. The perimeter regions representing a perimeter between sets of pixels with the first value (e.g., black) and with a second value (e.g., white). The segmentation module 230 may then identify areas bounded by the perimeter regions having the same value as the perimeter region. For example, the segmentation module 230 may identify a perimeter region of black pixels forming a portion of a circular shape and proximate to regions of white pixels. The segmentation module 230 may identify a bounded area of black pixels within the perimeter region of black pixels. In some instances, the bounded area may represent an area within the perimeter region which has a percentage of pixels with the first value above a predetermined percentage or a predetermined threshold. The segmentation module 230 may identify the combination of pixels of the perimeter region and the bounded area with the same pixel value (e.g., black) as the set of first pixels.

After identifying the set of first pixels, the segmentation module 230 may determine the approximate center of mass of the set of first pixels (e.g., the identified set of black pixels). The segmentation module 230 may calculate the center of mass using equation 1, as follows:

$$(x_{approx}, y_{approx}) = \frac{1}{|(x, y): \text{bin}(x, y) = 0|} \sum_{(x,y):\ bin(x,y)=0} (x, y)$$

Figure 8:
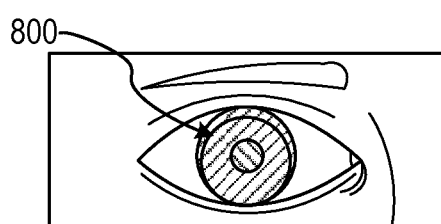
FIG. 8 illustrates a determination of an initial iris radius, according to some example embodiments.

In operation 340, the segmentation module 230 determines an initial measurement for one or more portion of the object of interest within the area of interest. For example, the segmentation module 230 may determine an initial iris radius 800 for the eye, as shown in FIG. 8. In various example embodiments, to determine the initial radius for the eye, the segmentation module 230 identifies a first distance from a first corner of the eye, identified within the area of interest, to a first portion of an outer edge of the iris. For example, segmentation module 230 identifies the first distance as a distance extending from a medial canthus of the eye, or proximate thereto, to a point on the outer edge of the iris located closest to the medial canthus. The segmentation module may then determine a second distance from a second corner of the eye to a second portion of the outer edge of the iris. For example, the segmentation module 230 identifies the second distance as a distance extending from a lateral canthus of the eye, or proximate thereto, to a point on the outer edge of the iris located closest to the lateral canthus. After determining the first distance and the second distance, the segmentation module 230 determines the initial iris radius based on the first distance and the second distance.

In some embodiments, the segmentation module 230 also determines a total distance extending from the first corner of the eye to the second corner of the eye. For example, the segmentation module 230 may determine the total distance extending from the medial canthus to the lateral canthus. In some embodiments, the segmentation module 230 determines the initial iris radius based on the first distance, the second distance, and the total distance. For example, the segmentation module 230 may take the total distance and subtract the first distance and the second distance, to determine an iris distance. The segmentation module 230 may then divide the iris distance in half to generate an initial iris radius.

In some embodiments, the segmentation module 230 determines the initial iris radius based on a predetermined iris ratio. For example, the segmentation module 230 may determine the initial iris radius by multiplying the total distance of the eye by 0.16 to determine the initial iris radius and center the initial iris radius at the initial pupil location.

In some embodiments, the segmentation module 230 determines a bridge distance extending between a medial canthus of a first eye and a medial canthus of a second eye. Once the iris radius, the total distance of each eye, and the bridge distance have been determined, the segmentation module 230 may determine a color of the iris. The segmentation module 230 may use the total distance of each eye, the bridge distance, and iris color as biometric measurements and associate the biometric measurements with an individual. The image segmentation system 160 may later identify the individual based on a match or a substantial match, taking into account lighting and other conditions, of an individual depicted in a subsequent video stream to the biometric measurements.

Figure 9:
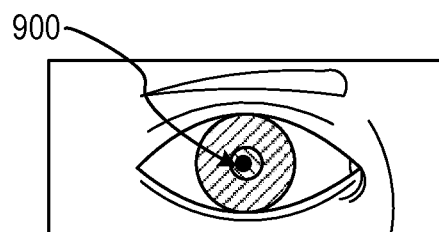
FIG. 9 illustrates a determination of a final pupil location, according to some example embodiments.

In operation 350, the segmentation module 230 determines a final location of the portion of the object of interest. For example, in some embodiments, the segmentation module 230 determines a final pupil location 900, as shown in FIG. 9. In various embodiments, to determine the final pupil location, the segmentation module 230 identifies one or more locations (e.g., pixels) which are close to the initial pupil location. In some embodiments, the identified one or more locations may be identified using the equation 1, shown above with respect to operation 330.

Here, the segmentation module 230, determines the one or more locations using the perimeter of the set of first pixels identified in operation 330. In some instances, the segmentation module 230 determines a set of locations using various perimeter pixels to account for variation in the shape of the set of first pixels of the binarized image. In some embodiments, the segmentation module 230 determines the one or more locations using pixels neighboring a center pixel identified at the initial pupil location. As previously discussed, the initial pupil location may be the center of mass of the set of first pixels (e.g., the set of black pixels). In these embodiments, the segmentation module 230 identifies the pixels proximate to or bordering the center pixel and uses each bordering or proximate pixel as the one or more locations close to the initial pupil location.

The segmentation module 230 evaluates the initial pupil location and the identified one or more locations with respect to the initial iris radius according to a quality function. An example quality function may be represented as equation 2, as follows:

$$\text{quality} = bp^3 * \text{irisRadius} * bg * \text{eyeWidth}/3 + \text{distFromCenter})$$

The variable "bp" represents a percentage of black pixels identified within an iris shape within the area of interest of an image. "irisRadius" is the initial iris radius. "bg" is a color gradient representing an area. "eyeWidth" represents the width of the eye including the iris and the pupil being located. "distFromCenter" represents a distance of the pupil location being measured (e.g., initial pupil location or the identified one or more locations) from the center of the width of the eye.

In some embodiments, the "bg" variable, representing the color gradient, may be determined by a color change function. For example, the color change function may represented as equation 3, as follows:

$$bg = \frac{1}{|\text{borderPixels}|} \sum_{(x,y) \in \text{borderPixels}} (\text{im}(x - \Delta x, y - \Delta y) - \text{im}(x + \Delta x, y + \Delta y))$$

As shown in equation 2, "borderPixels" may represent a set of coordinates (x, y) of all pixels which lie on a boundary of an iris shape. The variable "im(x, y)" may represent a value of a predetermined channel at a given pixel (x, y). For example, in some embodiments, as described with respect to the operation 320, the "im(x, y)" variable may represent a value for the red channel of the pixel at the given pixel. The variable "($\Delta x$, $\Delta y$)" may represent, for a given (x, y), a vector having a length below a predetermined threshold and directed towards the center of a given candidate iris location.

Within the method 300, using the equation 2, "bp" represents a percentage of black pixels (e.g., the set of first pixels in operation 330). The "bp" value is calculated as a relation of a black pixel count inside the set of first pixels, identified in operation 330. As stated above, "irisRadius" is the initial iris radius. The "eyeWidth" variable may represent the total distance of the eye determined in operation 340. The segmentation module 230 may determine the "distFromCenter" from the position within the area of interest of a location being processed (e.g., the initial pupil location and the identified one or more locations) and the "eyeWidth" variable (e.g., the total distance determined in operation 340).

In the above described embodiments using equations 1, 2, and 3, the segmentation module 230 identifies the location of the identified one or more locations (e.g., equation 1) and the initial pupil location which returns a highest quality value for the quality function (e.g., equation 2), with respect to a set of quality values for the other locations (e.g., the identified one or more locations and the initial pupil location).

Figure 10:
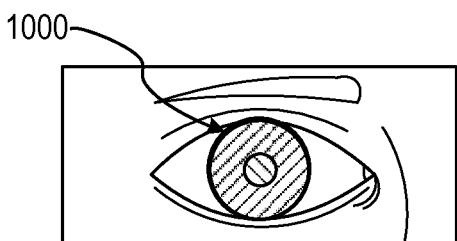
FIG. 10 illustrates a determination of a final iris location, according to some example embodiments.

In operation 360, the segmentation module 230 determines a final iris radius 1000, as shown in FIG. 10. In various example embodiments, the segmentation module 230 determines the final iris by identifying one or more radiuses for the set of first pixels identified in operation 330. In some embodiments, the segmentation module 230 may use the color change function (e.g., equation 3). In some instances, the color change function may produce a set of radiuses which have varying sizes and are smaller than the set of first pixels determined in operation 330. The segmentation module 230 identifies one or more radiuses from the set of radiuses with a radius above a predetermined radius value. For example, the segmentation module 230 may discard from consideration radiuses of the set of radiuses which have a value smaller than ninety percent of the initial radius. In some instances, the segmentation module 230 may discard from consideration radiuses of the set of radiuses having a value smaller than the initial radius.

In some instances, the operations 350 and 360 may be performed together by the segmentation module 230 during calculation of equations 2 and 3. Further, in some embodiments, where performed in succession, the segmentation module 230 may perform operation 360 prior to operation 350. In some situations, where the segmentation module 230 performs the operation 360 prior to performing operation 350, the segmentation module 230 may use the final iris radius to determine the final pupil location.

In operation 370, the segmentation module 230 forms a binary mask for the eye. The binary mask identifies a set of pixels associated with the iris of the eye. For example, the pixels identified in the set of first pixels may be identified as the set of pixels associated with the iris of the eye. In some instances, the binary mask is circular in shape and centered on the final pupil location. In some embodiments, the binary mask may be dynamically shaped by the segmentation module 230. For example, binary mask may initially be formed in a circular shape. The segmentation module 230 may determine a location of eyelids based on the binarized image and modify the circular shape, discarding portions of the binary mask representing portions of the iris obscured by the eyelids.

In operation 380, the tracking module 240 tracks at least one of the objects of interest and the portion of the object of interest. For example, in some example embodiments, the tracking module 240 tracks at least one of the final pupil location and the final iris radius across one or more images of the video stream. The video stream may include a first portion of video stream and a second portion of video stream. The first portion of video stream may be subject to the operations of the method 300 to identify and form the binary mask for the eye. The tracking module 240 receiving the binary mask as a first input, may receive the second portion of the video stream as a second input and track the binary mask (e.g., a location of pixels representing the iris of the eye) within or across one or more images included in the second portion of the video stream. In some instances, the tracking module 240 may track the entire face using a facial mesh including one or more binary masks representing one or more irises depicted on the face.

Figure 11:
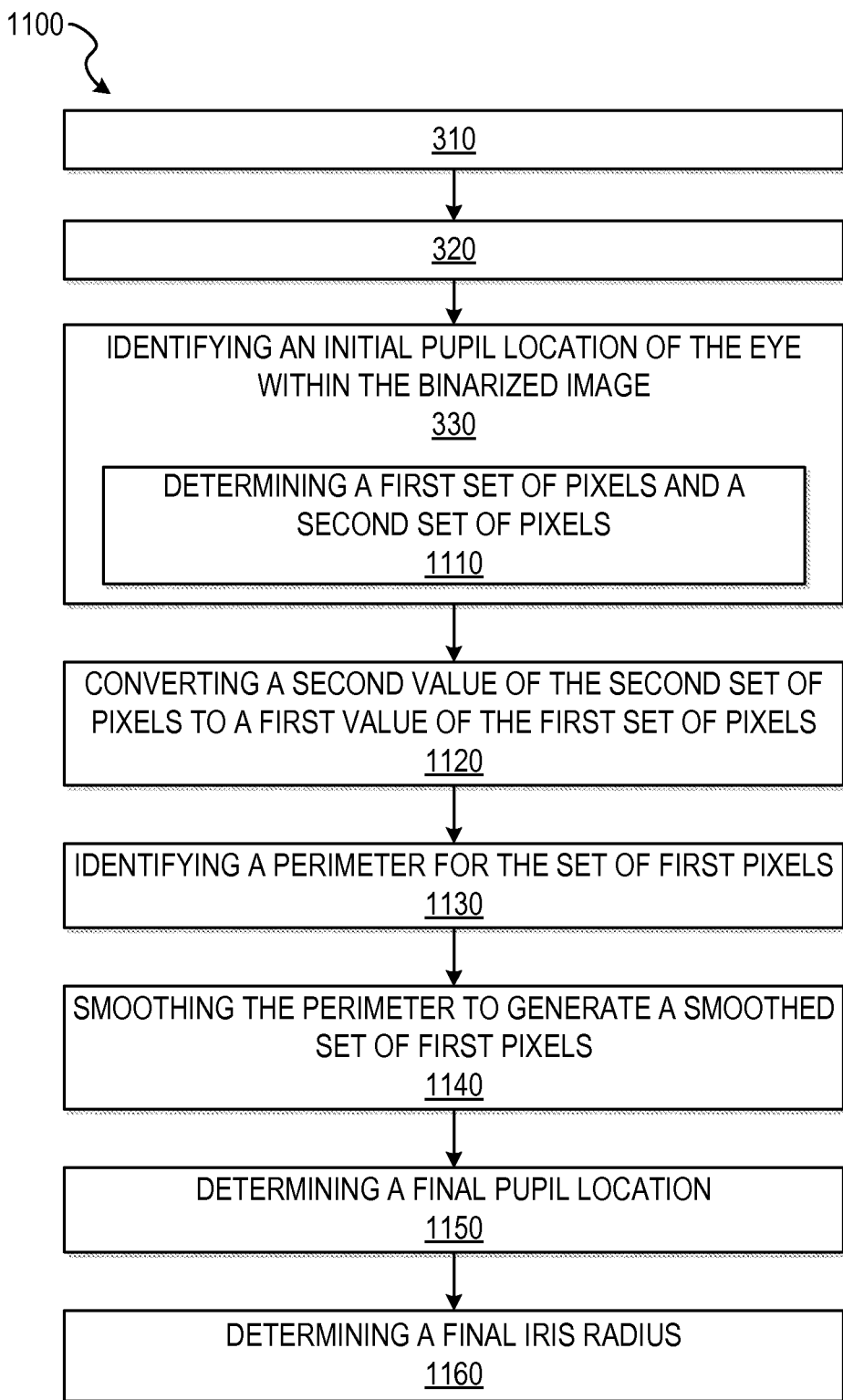
FIG. 11 is a flow diagram illustrating an example method for segmenting images within a video stream, according to some example embodiments.

FIG. 11 shows a flow diagram illustrating an example method 1100 for segmenting portions of a video stream. The operations of method 1100 may be performed by components of the image segmentation system 160. In some instances, certain operations of the method 1100 may be performed using one or more operations of the method 300 or as sub-operations of one or more operations of the method 300, as will be explained in more detail below.

In operation 1110, the segmentation module 230 determines the set of first pixels (e.g., the first pixels used in operation 330) and a set of second pixels within the binarized image. For example, as shown in FIG. 5, the set of first pixels 500 and the set of second pixels 510 are identified within the binarized image. The set of first pixels represent the iris and pupil of the eye within the area of interest. Further, the set of first pixels have a first value (e.g., a value of one indicating black pixels). The set of second pixels represent a noise region with a second value, different from the first value. The set of second pixels are positioned within the set of first pixels. The segmentation module 230 determines the noise region based on the area of the noise region being smaller than a predetermined percentage of the area of interest. For example, the segmentation module 230 may determine the area represented by a potential noise region and compare that area to a total are of the binarized image (e.g., the binarized version of the area of interest). In some embodiments, where the area of the potential noise region is below a predetermined threshold, the area is determined to represent a noise region. Where the area of the potential noise region exceeds a predetermined threshold (e.g., an area percentage), the potential noise region is determined to represent a formation other than noise.

Figure 6:
FIG. 6 illustrates a binarized image of an area of interest, according to some example embodiments.

In operation 1120 and as depicted in FIG. 6, where the potential noise region is determined to represent a noise region, for example by falling below the predetermined threshold, the segmentation module 230 converts the second value of the set of second pixels from the noise region to the first value. As shown in FIG. 6, the converted set of second pixels may integrate into the set of first pixels 600.

In some embodiments, the operations 1110 and 1120 are performed as precursor operations prior to the operation 330. In these embodiments, the set of first pixels and the set of second pixels are identified and the set of second pixels (e.g., the noise region) are converted to the first value so as to eliminate the noise region. After a noise region, determined to be present in the set of first pixels, has been eliminated, the segmentation module 230 may identify the initial pupil location 110 of the set of first pixels. In these embodiments, after noise regions have been removed and the initial pupil location (e.g., center of mass) has been determined for the integrated set of first pixels 600, the initial iris radius may also be determined as in the operation 340.

Referring again to FIG. 11, operations 1130 and 1140 may be performed as sub-operations or precursor operations to operations 350 and 360 of the method 300. In operation 430, the segmentation module 230 identifies a perimeter for the set of first pixels (e.g., the set of first pixels identified in operation 330). The perimeter includes a set of perimeter pixels having a first value. In some instances, the first value for the perimeter pixels is a one, indicating that the perimeter pixels are black, within the binarized image. The perimeter pixels act as a rough boundary representing the boundary between the iris and the sclera of the eye depicted by the binarized image.

In operation 1140, the segmentation module 230 smooths the perimeter to generate a smoothed set of first pixels. The smoothed set of first pixels may form a portion of a circular shape representing a visible portion of the iris and pupil not obstructed by the eyelids of the eye. In some embodiments, the perimeter is smoothed by modifying a value of one or more perimeter pixels of the set of perimeter pixels based on values of a set of proximate pixels.

In some instances, the operation 1130 comprises a set of sub-operations for smoothing the perimeter of the set of first pixels. For example, the segmentation module 230 identifies a modification area around each pixel of the set of perimeter pixels. In some instances, the modification area is defined as a square of pixels encircling a pixel of interest of the set of perimeter pixels. The segmentation module 230 then identifies a value associated with each pixel of the modification area. Where a portion, exceeding a predetermined threshold, of the pixels within the modification area share the same value and the value of the pixel of interest differs from the value of the portion of the pixels, the segmentation module 230 modifies the value of the pixel of interest to match the value of the portion of the pixels. For example, in some embodiments, the modification area may be divided into nine pixels. Where the pixel of interest has a value of zero and five of the pixels of the modification area have a value of one, the segmentation module 230 may modify the value of the pixel of interest to a value of one. The segmentation module 230 may continue modifying pixels within the set of perimeter pixels until the smoothed set of first pixels forms at least a portion of a circular shape. For example, the smoothed set of first pixels may approach a portion of a circular shape representing and resembling a visible portion of the iris.

In operation 1150, the segmentation module 230 determines the final pupil location based on the smoothed set of first pixels. For example, in some embodiments, the operation 1150 is performed similarly to the operation 350 where the "irisRadius" variable of equation 2 is a radius of the smoothed set of first pixels and the "bg" variable represents an area of the smoothed set of first pixels.

In operation 1160, the segmentation module 230 determines the final iris radius based on the smoothed set of first pixels. For example, in some embodiments, the operation 1140 is performed similarly to the operation 360 where the segmentation module 230 uses the color change function (e.g., equation 3) on the smoothed set of first pixels.

Figure 12:
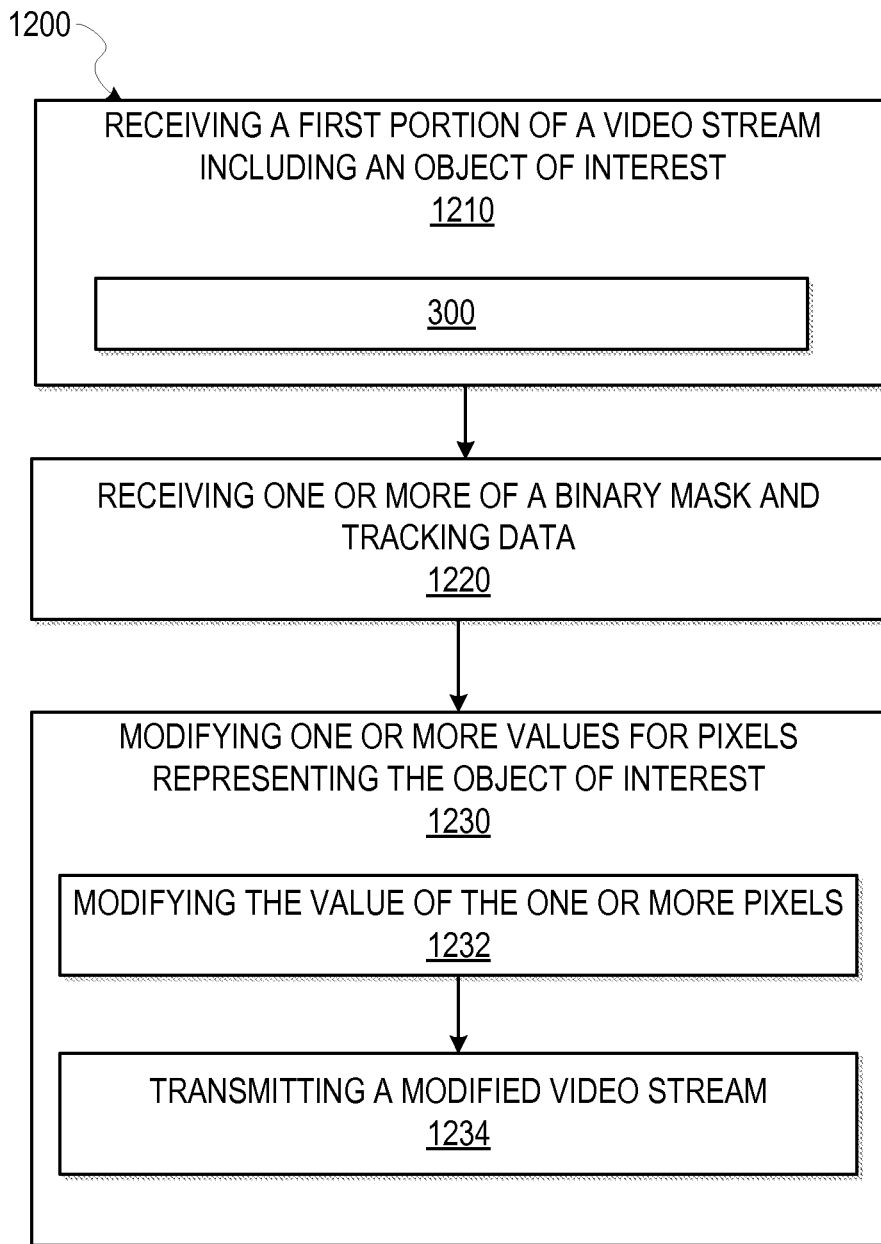
FIG. 12 is a flow diagram illustrating an example method for modifying a portion of a video stream, according to some example embodiments.

FIG. 12 depicts a flow diagram illustrating an example method 1200 of modifying a video stream using the image segmentation system 160. The operations of method 1200 may be performed by components of the image segmentation system 160. In some instances, certain operations of the method 1200 may be performed using one or more operations of the methods 300 or 1100, in one or more of the described embodiments, or as sub-operations of one or more operations of the methods 300 or 1100, as will be explained in more detail below.

In operation 1210, the location module 210 receives a first portion of a video stream from an imaging device coupled to the client device 110. The location module 210, the binarization module 220, and the segmentation module 230 perform one or more operations as described in the methods 300 or 1100. The segmentation module 230 may generate a binary mask indicative of pixels representing an object of interest depicted within one or more images of the first portion of the video stream.

In operation 1220, the modification module 250 receives one or more images of a video stream (e.g., the second video stream). The modification module 250 receives one or more of the binary mask from the segmentation module 230 and tracking data, representative of a location of the object of interest from the tracking module 240. The object of interest and the tracking data may be obtained via one or more of the method 300 and the method 1100.

In operation 1230, the modification module 250 modifies one or more value for pixels representing the object of interest. For example, the modification module 250 may modify a color value for the pixels representing the object of interest. In some instances, the modification module 250 applies a new mean color value for the pixels, removing color variation among the pixels or applying a color value for the pixels differing from an initial color value. In embodiments where the object of interest represented by the binary mask is an iris, the modification module 250 modifies the color of the iris within the video stream. The modification module 250 may use the tracking data and the binary mask to align and match the change to the object of interest as the object of interest moves among one or more images of the video stream.

In some embodiments, the operation 1230 contains one or more sub-operations. In operation 1232, the modification module 250 modifies the value of one or more pixels representing the object of interest within a second portion of the video stream, as described in operation 1230, to generate a modified video stream.

In operation 1234, the modification module 250 cooperates with the communication module 270 to transmit the modified video stream from the client device 110 to another client device. In some embodiments, the modified video stream may be transmitted as part of a video communication stream, such as a video communication stream output from a video conferencing application in cooperation with the image segmentation system 160.

Figure 13:
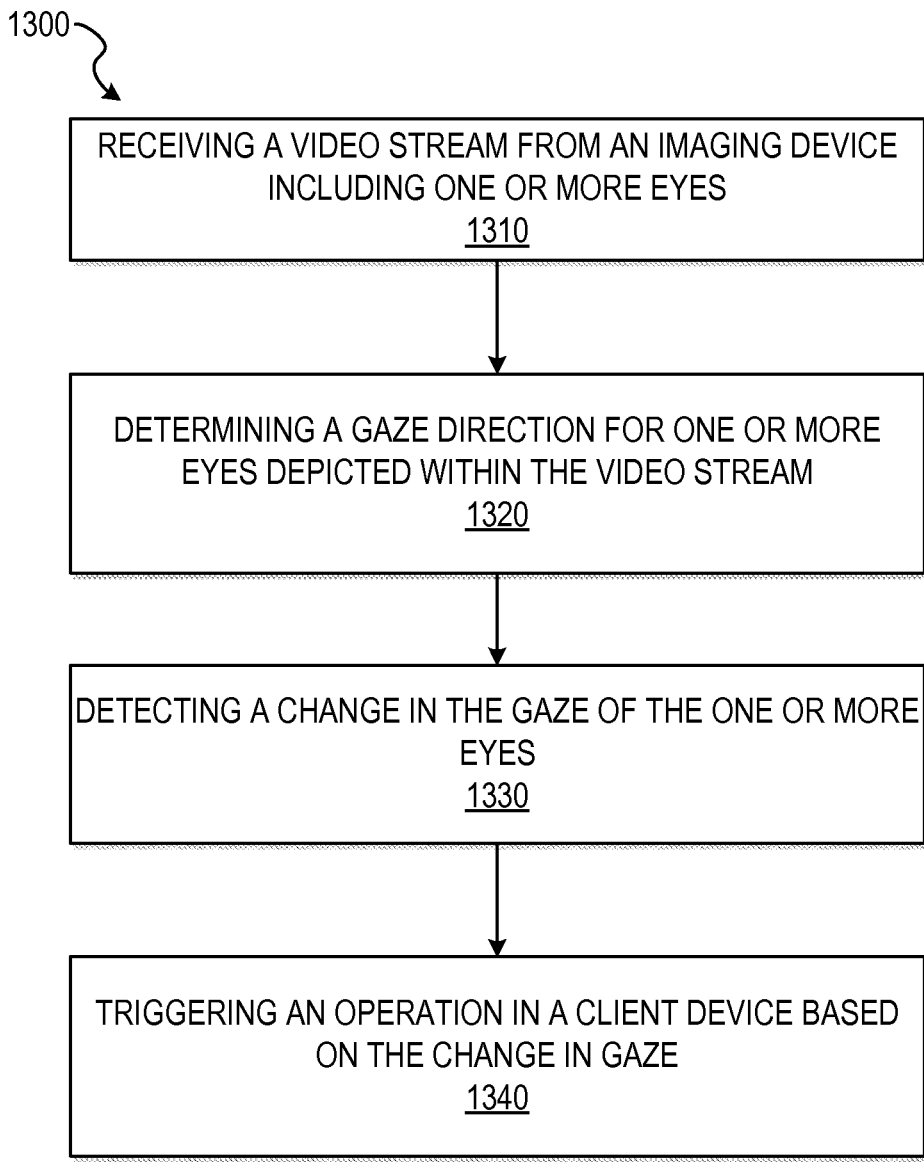
FIG. 13 is a flow diagram illustrating an example method for controlling one or more operations of the client device using image segmentation operations, according to some example embodiments.

FIG. 13 depicts a flow diagram illustrating an example method 1300 for controlling one or more operations of the client device via one or more functions of the image segmentation system 160. The operations of method 1300 may be performed by components of the image segmentation system 160. In some instances, certain operations of the method 1300 may be performed using one or more operations of the methods 300 or 1100, in one or more of the described embodiments, or as sub-operations of one or more operations of the methods 300 or 1100, as will be explained in more detail below.

In operation 1310, the location module 210 receives a video stream from an imaging device coupled to the client device 110. In some embodiments, the video stream includes one or more eye positioned to view a display device coupled to the client device 110. The location module 210, the binarization module 220, and the segmentation module 230 perform one or more operations as described in the methods 300 or 1100. The segmentation module 230 may generate a binary mask indicative of pixels representing an object of interest depicted within one or more images of the video stream.

In operation 1320, the gaze module 260 determines a gaze direction for one or more eyes depicted within the video stream. The gaze direction may represent an object or area of the display device at which the one or more eyes are directed. In some embodiments, the gaze module 260 determines the gaze direction for the one or more eyes by identifying a location of the eye relative to the imaging device and the display device, forming a triangle extending between the imaging device, the display device, and the one or more eyes. The gaze module 260 may receive the final pupil location from the binary mask, as determined by the segmentation module 230.

After determining the location of the one or more eye in space proximate to the client device 110, the gaze module 260 may determine the gaze direction by calculating a line of sight extending from the one or more eye to the display device. In some embodiments, the line of sight is represented by a cone extending from the one or more eye (e.g., a vertex of the cone) to the display device (e.g., a base of the cone). The radius of the cone and the slant height of the cone may be determined by the gaze module 260 based on the location of the one or more eyes and an angle of the line of sight (e.g., a line extending from the center of mass of the set of first pixels to the display device). In various embodiments, after determining the gaze direction, the gaze module 260 may automatically monitor the gaze direction across one or more images within the video stream captured by the imaging device of the client device 110. In other embodiments, other percentages may be used (e.g., five percent, ten percent, twenty percent).

In operation 1330, the gaze module 260 detects a change in the gaze of the one or more eyes, based on the monitoring of the gaze within the video stream. For example, the gaze module 260 may determine a change in the gaze direction based on a movement of the one or more eyes. In some instances, the gaze module 260 registers the change in the gaze direction when the calculated gaze direction changes by a value exceeding a predetermined gaze threshold. For example, the predetermined gaze threshold may be a distance equal to a percentage of a viewable area of the display device. In these instances, for example, the gaze module 260 may detect the change in gaze direction when the line of sight moves a distance along the display device greater than fifteen percent of the viewable area of the display device.

In some embodiments, the change in the gaze of the one or more eyes includes an obstruction of the one or more eyes. For example, the gaze module 260 may determine that the one or more eyes are obstructed for a time period greater than a predetermined time threshold. The obstruction may represent an intentional closing or partial closing of one or more eyelids of the one or more eyes.

In operation 1340, the gaze module 260 triggers an operation in the client device 110. For example, the gaze module 260, determining a change in the gaze of the one or more eyes, causes a user interface of the client device 110 to perform a predetermined operation.

In some embodiments, the client device 110 displays a user interface screen with scrolling enabled. Where the gaze module 260 determines a change in gaze direction exceeding a predetermined distance, the gaze module 260 causes the user interface of the client device 110 to scroll in the direction of the change in gaze direction. The gaze module 260 may cause the user interface to continue scrolling until the gaze module 260 determines a second change in gaze direction. In some instances, the second change in gaze direction is a return to an initial gaze direction. In some embodiments, the second change in gaze direction is a predetermined change representing a stop command indicating a desire to cease scrolling of the user interface screen.

Figure 14:
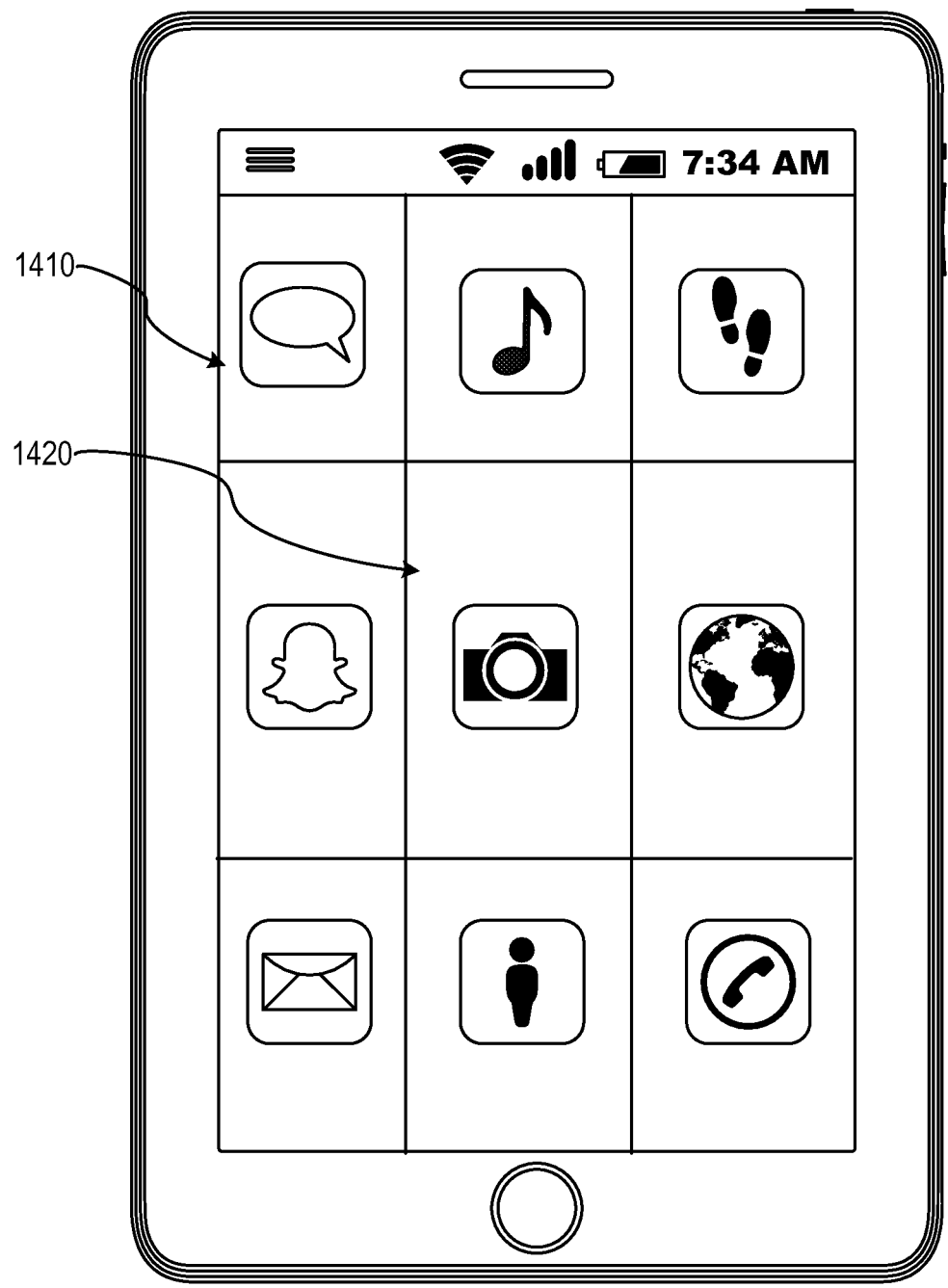
FIG. 14 illustrates an example user interface configured to perform one or more operations based on a gaze direction.

In some embodiments, the visible area of the display device of the client device 110 is logically divided in a plurality of regions, as shown in FIG. 14. The gaze module 260 may determine a plurality of changes in gaze. For example, a first change in gaze direction may exceed a predetermined distance. The first change in gaze may correspond to a change from a first region 1410 to a second region 1420. The second change in gaze may include an obstruction of the one or more eyes exceeding a predetermined time threshold. The second change in gaze may represent a predetermined command with respect to the second region 1420. For example, the second change in gaze may represent a selection of a user interface element located in the second region 1420. Where the gaze module 260 detects the first change in gaze and the second change in gaze, the gaze module 260 may cause the user interface of the client device 110 to select the user interface element to trigger one or more operations on the client device 110. For example, selection of the user interface element may cause an application launch within the user interface.

Modules, Components, and Logic

Certain embodiments are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, computer systems (e.g., a standalone computer system, a client computer system, or a server computer system) or hardware modules of a computer system (e.g., at least one hardware processor, a processor, or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented modules that operate to perform operations or functions described herein. As used herein, "processor-implemented module" refers to a hardware module implemented using processors.

Similarly, the methods described herein can be at least partially processor-implemented, with a particular processor or processors being an example of hardware. For example, at least some of the operations of a method can be performed by processors or processor-implemented modules. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Applications

Figure 15:
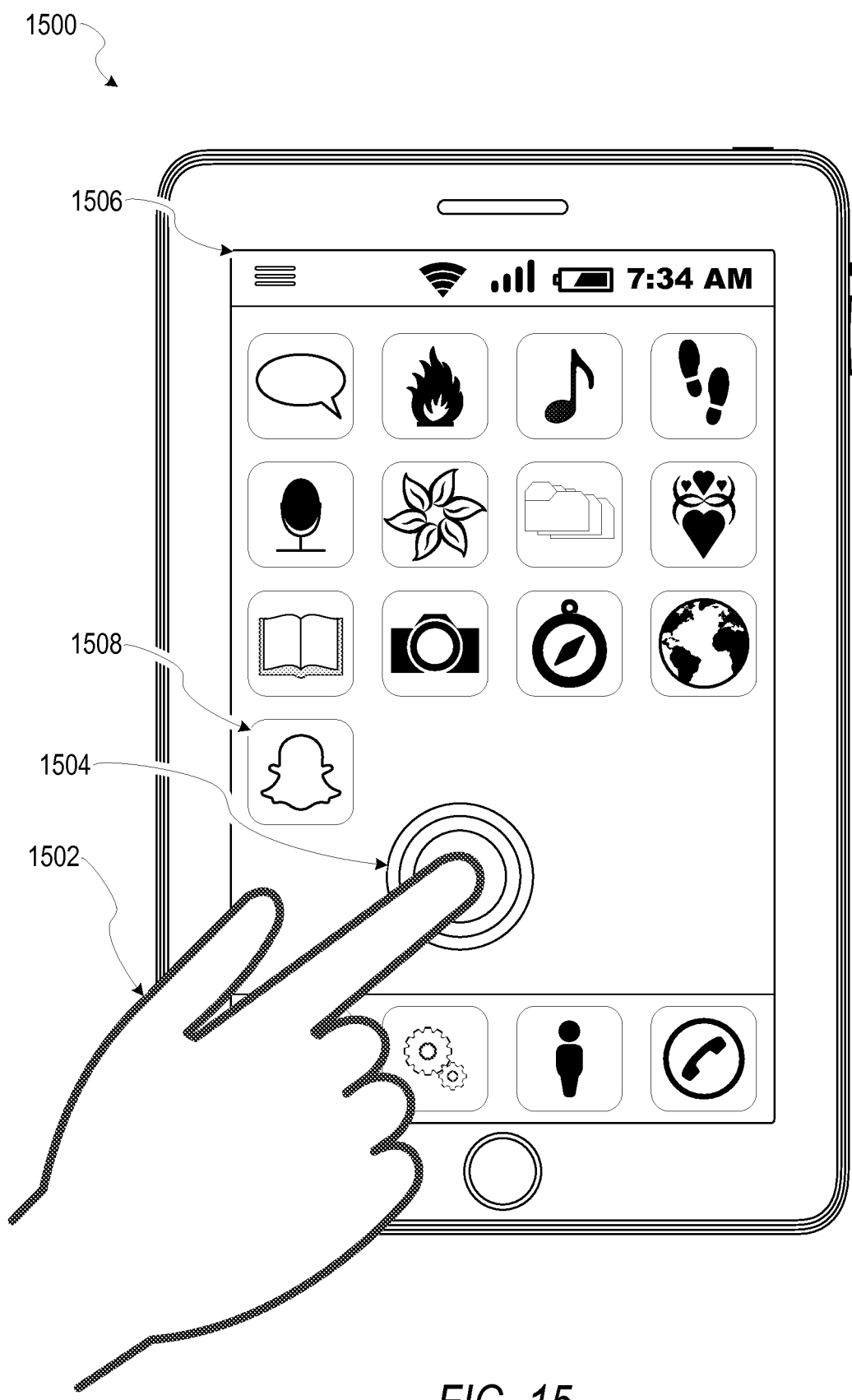
FIG. 15 is a user interface diagram depicting an example mobile device and mobile operating system interface, according to some example embodiments.

FIG. 15 illustrates an example mobile device 1500 executing a mobile operating system (e.g., IOS™, ANDROID™, WINDOWS® Phone, or other mobile operating systems), consistent with some embodiments. In one embodiment, the mobile device 1500 includes a touch screen operable to receive tactile data from a user 1502. For instance, the user 1502 may physically touch 1504 the mobile device 1500, and in response to the touch 1504, the mobile device 1500 may determine tactile data such as touch location, touch force, or gesture motion. In various example embodiments, the mobile device 1500 displays a home screen 1506 (e.g., Springboard on IOS™) operable to launch applications or otherwise manage various aspects of the mobile device 1500. In some example embodiments, the home screen 1506 provides status information such as battery life, connectivity, or other hardware statuses. The user 1502 can activate user interface elements by touching an area occupied by a respective user interface element. In this manner, the user 1502 interacts with the applications of the mobile device 1500. For example, touching the area occupied by a particular icon included in the home screen 1506 causes launching of an application corresponding to the particular icon.

The mobile device 1500, as shown in FIG. 15, includes an imaging device 1508. The imaging device may be a camera or any other device coupled to the mobile device 1500 capable of capturing a video stream or one or more successive images. The imaging device 1508 may be triggered by the image segmentation system 160 or a selectable user interface element to initiate capture of a video stream or succession of images and pass the video stream or succession of images to the image segmentation system for processing according to the one or more methods described in the present disclosure. In some instances, the imaging device may be configured with a predetermined focal length and at a predetermined distance and position with respect to a display device (e.g., the touchscreen) such that a distance and orientation of objects depicted within the video stream or successive images captured by the imaging device may be determined with respect to one or more of the mobile device 1500, the imaging device 1508, and the display device.

Many varieties of applications (also referred to as "apps") can be executing on the mobile device 1500, such as native applications (e.g., applications programmed in Objective-C, Swift, or another suitable language running on IOS™ or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1500 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1500 includes a social messaging app 1510 such as SNAPCHAT® that, consistent with some embodiments, allows users to exchange ephemeral messages that include media content. In this example, the social messaging app 1510 can incorporate aspects of embodiments described herein. For example, in some embodiments the social messaging application includes an ephemeral gallery of media created by users the social messaging application. These galleries may consist of videos or pictures posted by a user and made viewable by contacts (i.e., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present invention, including, e.g., tracking user's eye movement, iris movement or obstruction, and/or eye radius.

In some embodiments, an ephemeral message system may include messages having ephemeral video clips or images which are deleted following a deletion trigger event such as a viewing time or viewing completion. In such embodiments, a device may track user eye movement during viewing of an ephemeral message, and may implement any tracking, command, or interface method describe herein both as part of a generation of content for an ephemeral message or as part of a user viewing an ephemeral message.

Software Architecture

Figure 16:
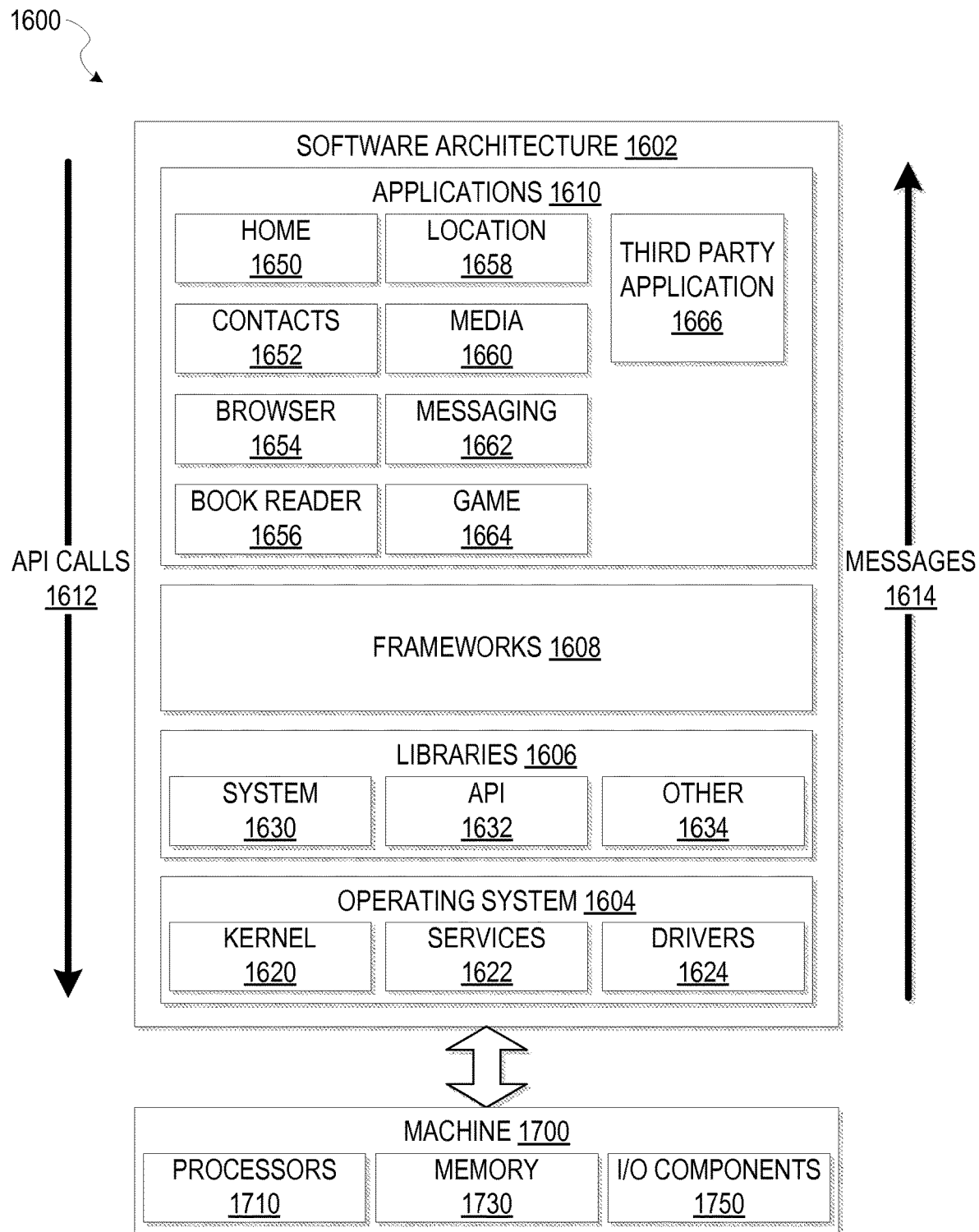
FIG. 16 is a block diagram illustrating an example of a software architecture that may be installed on a machine, according to some example embodiments.

FIG. 16 is a block diagram 1600 illustrating an architecture of software 1602, which can be installed on the devices described above. FIG. 16 is merely a non-limiting example of a software architecture, and it will be appreciated that many other architectures can be implemented to facilitate the functionality described herein. In various embodiments, the software 1602 is implemented by hardware such as machine a 1700 of FIG. 17 that includes processors 1710, memory 1730, and I/O components 1750. In this example architecture, the software 1602 can be conceptualized as a stack of layers where each layer may provide a particular functionality. For example, the software 1602 includes layers such as an operating system 1604, libraries 1606, frameworks 1608, and applications 1610. Operationally, the applications 1610 invoke application programming interface (API) calls 1612 through the software stack and receive messages 1614 in response to the API calls 1612, consistent with some embodiments.

In various implementations, the operating system 1604 manages hardware resources and provides common services. The operating system 1604 includes, for example, a kernel 1620, services 1622, and drivers 1624. The kernel 1620 acts as an abstraction layer between the hardware and the other software layers consistent with some embodiments. For example, the kernel 1620 provides memory management, processor management (e.g., scheduling), component management, networking, and security settings, among other functionality. The services 1622 can provide other common services for the other software layers. The drivers 1624 are responsible for controlling or interfacing with the underlying hardware, according to some embodiments. For instance, the drivers 1624 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1606 provide a low-level common infrastructure utilized by the applications 1610. The libraries 1606 can include system libraries 1630 (e.g., C standard library) that can provide functions such as memory allocation functions, string manipulation functions, mathematic functions, and the like. In addition, the libraries 1606 can include API libraries 1632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1606 can also include a wide variety of other libraries 1634 to provide many other APIs to the applications 1610.

The frameworks 1608 provide a high-level common infrastructure that can be utilized by the applications 1610, according to some embodiments. For example, the frameworks 1608 provide various graphic user interface (GUI) functions, high-level resource management, high-level location services, and so forth. The frameworks 1608 can provide a broad spectrum of other APIs that can be utilized by the applications 1610, some of which may be specific to a particular operating system or platform.

In an example embodiment, the applications 1610 include a home application 1650, a contacts application 1652, a browser application 1654, a book reader application 1656, a location application 1658, a media application 1660, a messaging application 1662, a game application 1664, and a broad assortment of other applications such as a third party application 1666. According to some embodiments, the applications 1610 are programs that execute functions defined in the programs. Various programming languages can be employed to create the applications 1610, structured in a variety of manners, such as object-oriented programming languages (e.g., Objective-C, Java, or C++) or procedural programming languages (e.g., C or assembly language). In a specific example, the third party application 1666 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third party application 1666 can invoke the API calls 1612 provided by the operating system 1604 to facilitate functionality described herein.

Example Machine Architecture and Machine-Readable Medium

Figure 17:
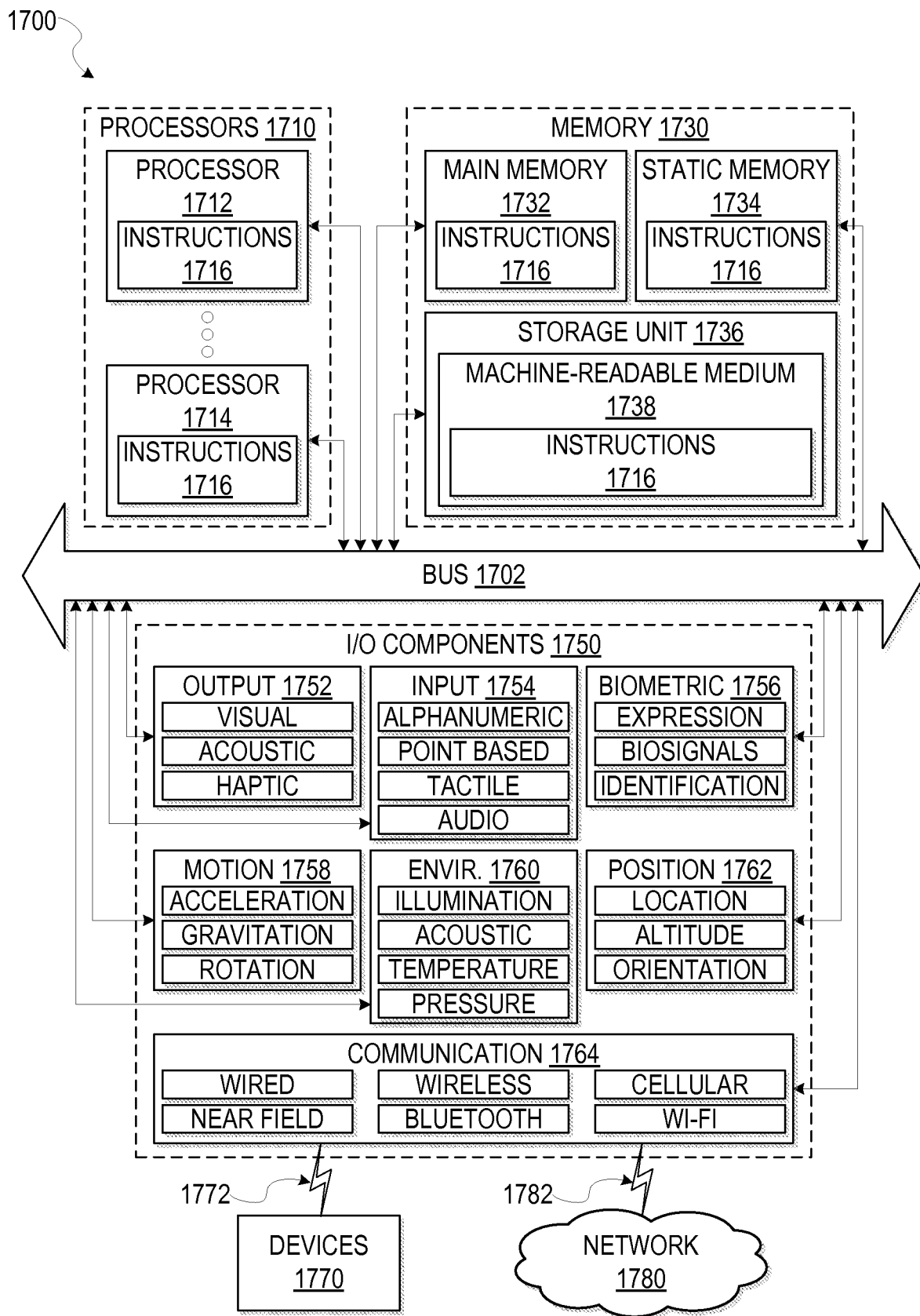
FIG. 17 is a block diagram presenting a diagrammatic representation of a machine in the form of a computer system within which a set of instructions may be executed for causing the machine to perform any of the methodologies discussed herein, according to an example embodiment.

FIG. 17 is a block diagram illustrating components of a machine 1700, according to some embodiments, able to read instructions from a machine-readable medium (e.g., a machine-readable storage medium) and perform any of the methodologies discussed herein. Specifically, FIG. 17 shows a diagrammatic representation of the machine 1700 in the example form of a computer system, within which instructions 1716 (e.g., software, a program, an application, an applet, an app, or other executable code) for causing the machine 1700 to perform any of the methodologies discussed herein can be executed. In alternative embodiments, the machine 1700 operates as a standalone device or can be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1716, sequentially or otherwise, that specify actions to be taken by the machine 1700. Further, while only a single machine 1700 is illustrated, the term "machine" shall also be taken to include a collection of machines 1700 that individually or jointly execute the instructions 1716 to perform any of the methodologies discussed herein.

In various embodiments, the machine 1700 comprises processors 1710, memory 1730, and I/O components 1750, which can be configured to communicate with each other via a bus 1702. In an example embodiment, the processors 1710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 1712 and a processor 1714 that may execute the instructions 1716. The term "processor" is intended to include multi-core processors that may comprise two or more independent processors (also referred to as "cores")

that can execute instructions contemporaneously. Although FIG. 17 shows multiple processors, the machine 1700 may include a single processor with a single core, a single processor with multiple cores (e.g., a multi-core processor), multiple processors with a single core, multiple processors with multiples cores, or any combination thereof.

The memory 1730 comprises a main memory 1732, a static memory 1734, and a storage unit 1736 accessible to the processors 1710 via the bus 1702, according to some embodiments. The storage unit 1736 can include a machine-readable medium 1738 on which are stored the instructions 1716 embodying any of the methodologies or functions described herein. The instructions 1716 can also reside, completely or at least partially, within the main memory 1732, within the static memory 1734, within at least one of the processors 1710 (e.g., within the processor's cache memory), or any suitable combination thereof, during execution thereof by the machine 1700. Accordingly, in various embodiments, the main memory 1732, the static memory 1734, and the processors 1710 are considered machine-readable media 1738.

As used herein, the term "memory" refers to a machine-readable medium 1738 able to store data temporarily or permanently and may be taken to include, but not be limited to, random-access memory (RAM), read-only memory (ROM), buffer memory, flash memory, and cache memory. While the machine-readable medium 1738 is shown in an example embodiment to be a single medium, the term "machine-readable medium" should be taken to include a single medium or multiple media (e.g., a centralized or distributed database, or associated caches and servers) able to store the instructions 1716. The term "machine-readable medium" shall also be taken to include any medium, or combination of multiple media, that is capable of storing instructions (e.g., instructions 1716) for execution by a machine (e.g., machine 1700), such that the instructions, when executed by processors of the machine 1700 (e.g., processors 1710), cause the machine 1700 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1750 include a wide variety of components to receive input, provide output, produce output, transmit information, exchange information, capture measurements, and so on. In general, it will be appreciated that the I/O components 1750 can include many other components that are not shown in FIG. 17. The I/O components 1750 are grouped according to functionality merely for simplifying the following discussion, and the grouping is in no way limiting. In various example embodiments, the I/O components 1750 include output components 1752 and input components 1754. The output components 1752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1754 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1750 include biometric components 1756, motion components 1758, environmental components 1760, or position components 1762, among a wide array of other components. For example, the biometric components 1756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1758 include acceleration sensor components (e.g., accelerometer), gravitation sensor components, rotation sensor components (e.g., gyroscope), and so forth. The environmental components 1760 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1750 may include communication components 1764 operable to couple the machine 1700 to a network 1780 or devices 1770 via a coupling 1782 and a coupling 1772, respectively. For example, the communication components 1764 include a network interface component or another suitable device to interface with the network 1780. In further examples, communication components 1764 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1770 may be another machine or any of a wide variety of peripheral devices (e.g., a peripheral device coupled via a Universal Serial Bus (USB)).

Moreover, in some embodiments, the communication components 1764 detect identifiers or include components operable to detect identifiers. For example, the communication components 1764 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1764, such as location via Internet Protocol (IP) geolocation, location via WI-FI® signal triangulation, location via detecting a BLU-ETOOTH® or NFC beacon signal that may indicate a particular location, and so forth.

Transmission Medium

In various example embodiments, portions of the network 1780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1780 or a portion of the network 1780 may include a wireless or cellular network, and the coupling 1782 may be a Code Division Multiple Access (CDMA) connection, a Global System for Mobile communications (GSM) connection, or another type of cellular or wireless coupling. In this example, the coupling 1782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1716 are transmitted or received over the network 1780 using a transmission medium via a network interface device (e.g., a network interface component included in the communication components 1764) and utilizing any one of a number of well-known transfer protocols (e.g., Hypertext Transfer Protocol (HTTP)). Similarly, in other example embodiments, the instructions 1716 are transmitted or received using a transmission medium via the coupling 1772 (e.g., a peer-to-peer coupling) to the devices 1770. The term "transmission medium" shall be taken to include any intangible medium that is capable of storing, encoding, or carrying the instructions 1716 for execution by the machine 1700, and includes digital or analog communications signals or other intangible media to facilitate communication of such software.

Furthermore, the machine-readable medium 1738 is non-transitory (in other words, not having any transitory signals) in that it does not embody a propagating signal. However, labeling the machine-readable medium 1738 "non-transitory" should not be construed to mean that the medium is incapable of movement; the medium should be considered as being transportable from one physical location to another. Additionally, since the machine-readable medium 1738 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method for segmenting a video stream, comprising:
   determining an approximate location of an eye within a video stream comprising a set of images to identify an area of interest within one or more images of the set of images;
   binarizing the area of interest within the one or more images to generate at least one binarized image from the video stream;

identifying an initial pupil location of a pupil of the eye within the at least one binarized image;
determining an initial iris radius for an iris of the eye from the at least one binarized image;
based on the initial pupil location and the initial iris radius, determining a final pupil location and a final iris radius; and
modifying one or more values for pixels representing the iris within the video stream.

2. The method of claim 1,
identifying the initial pupil location of the pupil of the eye within the binarized image comprises identifying a set of first pixels within the binarized image, the set of first pixels having a first value and having an area greater than a predetermined percentage of the area of interest and determine an approximate center of mass of the set of first pixels.

3. The method of claim 1, wherein the modifying comprises:
modifying a color of the iris.

4. The method of claim 3, wherein the modifying the color of the iris comprises:
applying a new mean color to the pixels representing the iris.

5. The method of claim 1, wherein determining the initial iris radius comprises:
identifying, within the at least one binarized image, a first distance from a first corner of the eye to an outer edge of the iris and a second distance from a second corner of the eye to the outer edge of the iris; and
determining the initial iris radius based on the first distance and the second distance.

6. The method of claim 5, wherein determining the final iris radius comprises:
identifying a perimeter for a set of first pixels within the binarized image, the set of first pixels having a first value and representing an area of the iris and the pupil;
smoothing the perimeter by modifying a value of one or more perimeter pixels of the set of perimeter pixels based on values of a set of proximate pixels, to generate a smoothed set of first pixels; and
determining the final iris radius based on the smoothed set of first pixels.

7. The method of claim 1, wherein the video stream is a first portion of a video stream, and the method further comprises:
tracking at least one of the final pupil location and the final iris radius across one or more images included in a second portion of the video stream.

8. The method of claim 1, wherein the binarizing generates a binary mask and wherein the method further comprises:
receiving tracking data representing a location of the eye;
wherein the modifying comprises aligning and matching changes to the pixels representing the eye within the video stream using the tracking data and the binary mask as the eye moves among images of the video stream.

9. A system, comprising:
one or more processors; and
a memory accessible by the one or more processor, the memory including instructions for execution by the one or more processors that configure the one or more processors to:
determine an approximate location of an eye object within a video stream comprising a set of images to identify an area of interest within one or more images of the set of images;
binarize the area of interest within the one or more images to generate at least one binarized image from the video stream;
identify an initial pupil location of a pupil of the eye within the at least one binarized image;
determine an initial iris radius for an iris of the eye from the at least one binarized image;
based on the initial pupil location and the initial iris radius, determine a final pupil location and a final iris radius, and
modify one or more values for pixels representing the iris within the video stream.

10. The system of claim 9, wherein the instructions further configure the one or more processors to:
identify the initial pupil location of the pupil of the eye within the binarized image by identifying a set of first pixels within the binarized image, the set of first pixels having a first value and having an area greater than a predetermined percentage of the area of interest and determine an approximate center of mass of the set of first pixels.

11. The system of claim 9, wherein the instruction to modify one or more values for pixels representing the object of interest within the video stream comprises an instruction to:
modify a color of the iris.

12. The system of claim 11, wherein the instruction to modify a color of the iris comprises an instruction to:
apply a new mean color to the pixels representing the iris.

13. The system of claim 9, wherein the instruction to determine the initial iris radius comprises instructions to:
identify, within the at least one binarized image, a first distance from a first corner of the eye to an outer edge of the iris and a second distance from a second corner of the eye to the outer edge of the iris; and
determine the initial iris radius based on the first distance and the second distance.

14. The system of claim 13, wherein the instruction to determine the final iris radius comprises instructions to:
identify a perimeter for a set of first pixels within the binarized image, the set of first pixels having a first value and representing an area of the iris and the pupil;
smooth the perimeter by modifying a value of one or more perimeter pixels of the set of perimeter pixels based on values of a set of proximate pixels, to generate a smoothed set of first pixels; and
determine the final iris radius based on the smoothed set of first pixels.

15. The system of claim 9, wherein the video stream is a first portion of a video stream and wherein the instructions further configure the one or more processors to:
track at least one of the final pupil location and the final iris radius across one or more images included in a second portion of the video stream.

16. The system of claim 9, wherein the instruction to binarize the area of interest generates a binary mask and wherein the instructions further configure the one or more processors to:
receive tracking data representing a location of the eye;
wherein the instruction to modify one or more values for pixels representing the eye within the video stream comprises aligning and matching changes to the pixels representing the eye within the video stream using the tracking data and the binary mask as the eye moves among images of the video stream.

17. A non-transitory machine-readable storage medium storing processor executable instructions that, when executed by a processor of a machine, cause the machine to perform operations comprising:
- determining an approximate location of an eye object within a video stream comprising a set of images to identify an area of interest within one or more images of the set of images;
- binarizing the area of interest within the one or more images to generate at least one binarized image from the video stream;
- identifying an initial pupil location of a pupil of the eye within the at least one binarized image;
- determining an initial iris radius for an iris of the eye from the at least one binarized image;
- based on the initial pupil location and the initial iris radius, determining a final pupil location and a final iris radius; and
- modifying one or more values for pixels representing the iris within the video stream.

18. The non-transitory machine-readable storage medium of claim 17, wherein the operations further comprise:
- identifying the initial pupil location of the pupil of the eye within the binarized image by identifying a set of first pixels within the binarized image, the set of first pixels having a first value and having an area greater than a predetermined percentage of the area of interest and determine an approximate center of mass of the set of first pixels.

19. The non-transitory machine-readable storage medium of claim 17, wherein the video stream is a first portion of a video stream, and the operations further comprise:
- tracking at least one of the final pupil location and the final iris radius across one or more images included in a second portion of the video stream.

20. The non-transitory machine-readable storage medium of claim 17, wherein the binarizing generates a binary mask and wherein the operations further comprise:
- receiving tracking data representing a location of the eye;
- wherein the modifying comprises aligning and matching changes to the pixels representing the eye within the video stream using the tracking data and the binary mask as the eye moves among images of the video stream.

* * * * *